(12) United States Patent
Shiraishi et al.

(10) Patent No.: US 7,072,257 B2
(45) Date of Patent: Jul. 4, 2006

(54) DATA RECORDING CONTROLLER

(75) Inventors: Takuya Shiraishi, Ogaki (JP); Shin-ichiro Tomisawa, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 378 days.

(21) Appl. No.: 10/379,389

(22) Filed: Mar. 4, 2003

(65) Prior Publication Data
US 2003/0223331 A1  Dec. 4, 2003

(30) Foreign Application Priority Data
Mar. 6, 2002  (JP) ............... 2002-059842

(51) Int. Cl.
G11B 5/09  (2006.01)
(52) U.S. Cl. ................ 369/47.22; 369/47.3; 369/47.24
(58) Field of Classification Search ............. 369/47.22, 369/47.3, 47.24, 4–31
See application file for complete search history.

(56) References Cited

U.S. PATENT DOCUMENTS

| | | | | |
|---|---|---|---|---|
| 4,837,638 A | * | 6/1989 | Fullwood | 386/61 |
| 5,257,254 A | * | 10/1993 | Kutaragi | 369/30.26 |
| 5,282,049 A | * | 1/1994 | Hatakenaka et al. | 386/111 |
| 5,471,452 A | * | 11/1995 | Kishi | 369/53.24 |
| 5,761,169 A | * | 6/1998 | Mine et al. | 369/84 |
| 6,804,188 B1 | * | 10/2004 | Shishido et al. | 369/275.3 |
| 2002/0012300 A1 | * | 1/2002 | Kim | 369/47.31 |
| 2002/0018412 A1 | * | 2/2002 | Miyashita et al. | 369/47.24 |
| 2004/0160869 A1 | * | 8/2004 | Kim | 369/47.31 |

* cited by examiner

*Primary Examiner*—Thang V. Tran
*Assistant Examiner*—Van Pham
(74) *Attorney, Agent, or Firm*—Fish & Richardson P.C.

(57) ABSTRACT

A controller for recording data on a CD with a DVD recorder. The controller includes an LPP decoder, an ATIP decoder for decoding address information of a CD, and an address converter for converting an ATIP address into an LPP address. When recording DVD format data on a CD, a write timing generation circuit is driven in response to the LPP address, which is converted from the ATIP address. The write data is modulated for use in the CD, and the intensity of the write data is adjusted for use in the CD.

18 Claims, 6 Drawing Sheets

Fig.4

| CD ATIP Address | | | DVD LPP Address | |
|---|---|---|---|---|
| MIN | SEC | FRM | SECTOR | |
| 80 | 00 | 00 | 0x0040E0 | |
| 80 | 00 | 01 | 0x0040E2 | |
| 80 | 00 | 02 | 0x0040E4 | Reserved Area |
| ⋮ | | | ⋮ | |
| 99 | 59 | 73 | 0x02FFFC | |
| 99 | 59 | 74 | 0x02FFFE | |
| 00 | 00 | 00 | 0x030000 | |
| 00 | 00 | 01 | 0x030002 | |
| 00 | 00 | 02 | 0x030004 | |
| ⋮ | | | ⋮ | |
| 00 | 00 | 09 | 0x030012 | |
| 00 | 00 | 10 | 0x030014 | User Area |
| ⋮ | | | ⋮ | |
| 00 | 00 | 74 | 0x030094 | |
| 00 | 01 | 00 | 0x030096 | |
| ⋮ | | | ⋮ | |
| 00 | 59 | 74 | 0x032326 | |
| 01 | 00 | 00 | 0x032328 | |
| ⋮ | | | ⋮ | |
| 79 | 59 | 74 | 0x0DFC7E | |

DATA RECORDING CONTROLLER

CROSS-REFERENCE TO RELATED APPLICATION

This application is based upon and claims the benefit of priority from the prior Japanese Patent Application No. 2002-059842 filed on Mar. 6, 2002, the entire contents of which are incorporated herein by reference.

BACKGROUND OF THE INVENTION

The present invention relates to a data recording controller for controlling the recording of a data recorder.

Devices for recording a large capacity of data on optical discs have become widely used. Address information indicating write positions of data are normally provided in an optical disc. A compact disc (CD) has a single spiral recording track for recording information. The information device uses a writable recording medium, such as a compact disc-recordable (CD-R) or a compact disc rewritable (CD-RW) The recording track of a writable CD includes grooves formed in flat surfaces (lands) of the disc. Each groove is slightly wobbled and thus referred to as a wobble. Absolute time in pre-groove (ATIP), which corresponds to the cyclic change of the wobble, is written to the optical disc. The recording track is traced to read the ATIP information and obtain absolute time information of the present recording position (address). The absolute time information is address information designating a position, or write position, on the disc.

Wobbles are also preformed in a digital versatile disc (DVD), which has a larger storage capacity than a CD.

However, the wobbles of a DVD do not necessarily include address information. In a DVD, sections containing address information, or land pre-pits (LPPs) are arranged on the recording track at predetermined intervals. The address information of the LPPs does not represent the absolute time information of recording track positions and are sector numbers, which are successively added.

In this manner, the address information is configured differently in a CD and a DVD. Further, the format of the address information and the method for modulating the address information differs between a CD and a DVD Accordingly, referring to FIG. 1, a data recording-reproducing device that records data on and reproduces data from both CDs and DVDs includes a controller 50, which controls a CD data recording-reproducing section and a DVD data recording-reproducing section.

When writing data to a DVD, a head 102 picks up a signal from a disc 101. An LPP detection circuit 113 extracts an LPP signal 113a from the signal and provides the LPP signal 113a to an LPP decoder 114. The LPP decoder 114 extracts LPP data 114a, which includes address information of the disc, from the LPP signal 113a and provides the LPP data 114a to a DVD write timing generation circuit 115. An 8-16 modulation circuit 116 modulates write data in accordance with a command from the DVD write timing generation circuit 115 and provides the modulated write data to a DVD write strategy circuit 117. The DVD write strategy circuit 117 generates a pulse signal (write signal), which corresponds to the output intensity of a laser beam, from the 8-16 modulated write data. The pulse signal is sent to a write signal gate 119 via a selector 118, which selects an input signal in accordance with a switch control signal. The write signal gate 119 provides the selected pulse signal to the head 102 in accordance with a timing signal received from the DVD write timing generation circuit 115. Data is written to a DVD in this manner.

When the recording-reproducing device of FIG. 1 writes data to a CD, the head 102 picks up a signal from the disc 101. A wobble detection circuit 123 extracts a wobble signal 123a from the signal and provides the wobble signal 123a to an ATIP decoder 124. The ATIP decoder 124 extracts ATIP data 124a, which includes address information of the disc, from the wobble signal 123a and provides the ATIP data 124a to a CD write timing generation circuit 125. An 8-14 modulation circuit 126 modulates write data in accordance with an instruction from the CD write timing generation circuit 125 and provides the modulated write data to a CD write strategy circuit 127.

The CD write strategy circuit 127 generates a pulse signal (write signal), which corresponds to the output intensity of a laser beam, from the 8-14 modulated write data. The pulse signal is sent to the write signal gate 119 via the selector 118. The write signal gate 119 provides the selected pulse signal to the head 102 in accordance with a timing signal received from the CD write timing generation circuit 125. Data is written to a CD in this manner.

The process for reading data from a recording medium with the recording-reproducing device of FIG. 1 will now be discussed.

Referring to FIG. 2A, when the recording-reproducing device reads data from a DVD, a signal read by a pickup 130 is amplified by an RF amp 131. A binary circuit 132 converts the amplified signal to digital data of 0 or 1. A read channel circuit 133 generates a read channel clock signal, which has a predetermined frequency, from the digital data, samples the digital data in accordance with the reach channel clock signal, and restores 16 bits of digital data. A DVD synchronization detecting circuit 134 detects a synchronizing signal from the restored digital data to extract data, which is subject to reading. An 8-16 demodulation circuit 135 demodulates the extracted data to 8 bits of data. The demodulated data is sent to a DRAM 137 via a buffering circuit 136

Referring to FIG. 2B, when the recording-reproducing device reads data from a CD, digital data read and sampled from a CD is synchronized by a CD synchronization detection circuit 144 and demodulated by an 8-14 demodulation circuit 145. Other processes are performed in the same manner as in FIG. 2A.

As described above, the controller 50 of a recording-reproducing device that reads data from and writes data to both DVDs and CDs requires an exclusive circuit for each type of recording medium that has a different recording format. Thus, the controller 50 has a complicated configuration. Further, a DVD exclusive recording-reproducing device does not include processing circuits that are unique for CDs and thus cannot be used for CDs, which are popular and economic.

SUMMARY OF THE INVENTION

One aspect of the present invention is a data recording controller for controlling recording of data to a first disc medium on which first address information is recorded in compliance with a first recording format, in compliance with a second recording format that has a recording density greater than the first recording format. The data recording controller includes a first address generation circuit which generates first address data based on the first address information read from the first disc medium, a conversion circuit connected to the first address generation circuit which generates converted address data in compliance with the second recording format from the first address data, and a first timing generation circuit which generates a timing for writing of data to the first disc medium based on the converted address data.

A further aspect of the present invention is a data recording controller for recording data to a first recording medium on which first address information complying with a first recording format is recorded, in compliance with a second recording format corresponding to a second recording medium, having a recording density that is greater than the first recording medium. The data recording controller includes a first decoder which decodes a signal read from the first recording medium and generates first address data in compliance with the first format, a converter connected to the first decoder which generates converted address data complying with the second format from the first address data, and a second decoder which decodes a signal read from the second recording medium and generating second address data complying with the second format.

A further aspect of the present invention is a method for controlling recording of data to a recording medium on which first address information is recorded complying with a first recording format, in compliance with a second recording format that has a recording density greater than the first recording format. The method includes reading first address information from the recording medium, generating first address data based on first address information read from the recording medium, converting the first address data into converted address data complying with the second recording format, generating a timing for writing data to the recording medium based on the converted address data, and recording data to the recording medium in accordance with said timing.

BRIEF DESCRIPTION OF THE DRAWINGS

The invention, together with objects and advantages thereof, may best be understood by reference to the following description of the presently preferred embodiments together with the accompanying drawings in which:

FIG. 4 shows an example of address conversion from a CD format to a DVD format;

DETAILED DESCRIPTION OF THE PREFERRED EMBODIMENTS

Figure 5:
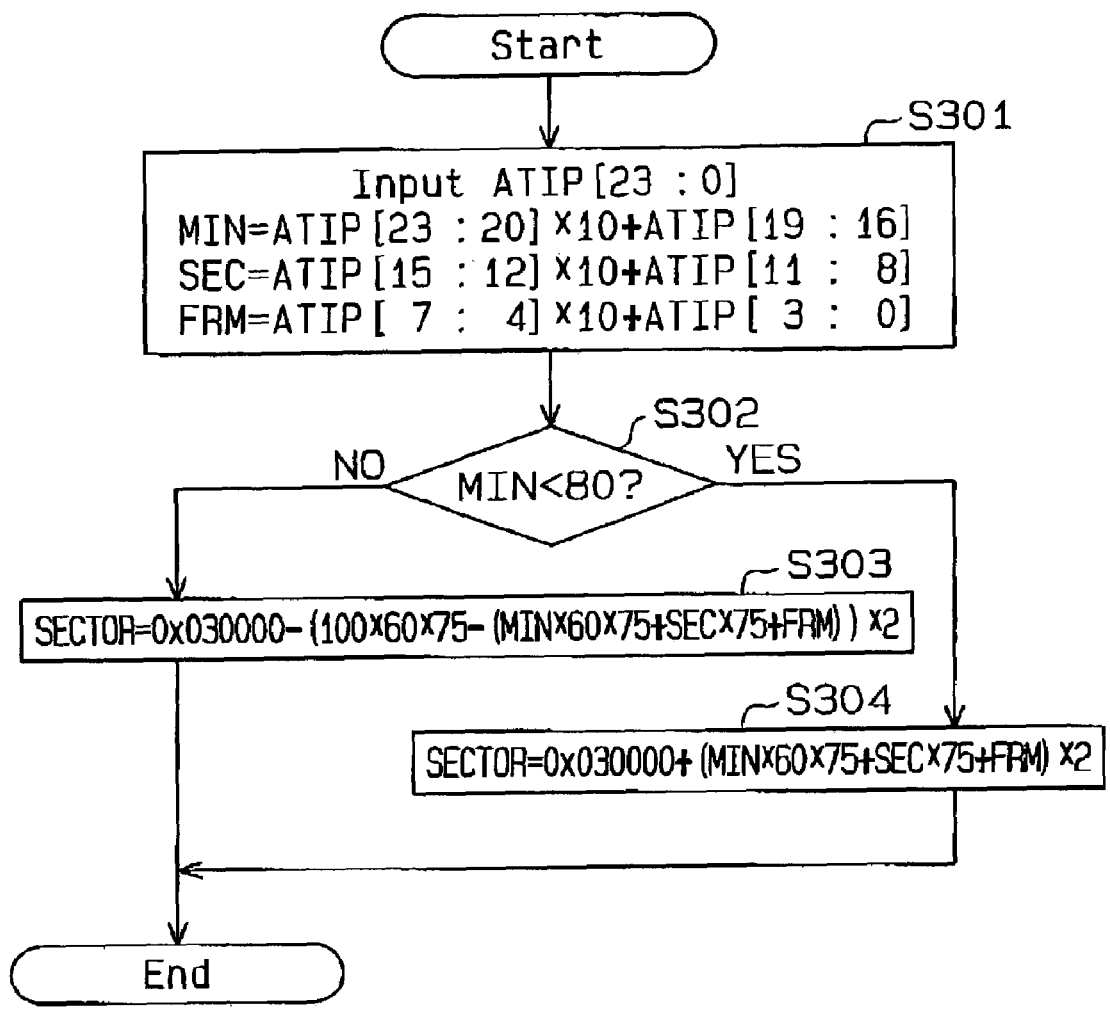
FIG. 5 is a flow illustrating address conversion.

A data recording controller 100 according to a first embodiment of the present invention will now be described with reference to FIGS. 3 to 5. The first embodiment relates to a controller 100 for recording data in DVD format to a CD with a DVD data recorder. In the specification, a CD refers to a writable CD and a DVD refers to a writable DVD.

The flow of signals when recording data on a DVD and a CD will now be described.

When writing DVD format data to a DVD, a head 12 picks up a signal from a disc 11. An LPP detection circuit 13 generates an LPP signal 13a from the signal. An address generation circuit, or an LPP decoder 14, generates LPP data 14a, which includes address (position) information of the disc 11, from the LPP signal 13a.

The LPP data 14a is selected by a selector 51, which operates in accordance with a switching control signal, and is provided to a write timing generation circuit 15. An 8-16 modulation circuit 16 modulates write data, which is sent from an external device, in accordance with a command from the write timing generation circuit 15 and provides the modulated data to a DVD write strategy circuit 17. The DVD write strategy circuit 17 generates a write signal from the modulated data. The write signal is selected by a selector 18, which operates in accordance with a switching control signal, and is provided to a write signal gate 19. The write signal gate 19 provides the selected write signal to the head 12 in response to a timing signal, which is generated by the write timing generation circuit 15. In this way, the desired data is written to a predetermined position of the disc (DVD) 11.

When writing DVD format data to a CD, the head 12 picks up a signal from the disc 11, and a wobble detection circuit 23 generates a wobble signal 23a from the signal. An address generation circuit, or an ATIP decoder 24, generates ATIP data 24a, which includes address information of the disc 11, from the wobble signal 23a.

The ATIP data 24a is provided to an address converter 55. The address converter 55 converts the ATIP data 24a, which includes the address information having the CD format, into LPP data 55a, which includes address information in DVD format. The converted LPP data 55a is input to the write timing generation circuit 15 via the selector 51.

The 8-16 modulation circuit 16 modulates write data, which is sent from an external device, in accordance with a command from the write timing generation circuit 15 and provides the modulated write data to a CD write strategy circuit 27. The CD write strategy circuit 27 generates a write signal, the intensity of which is adjusted, from the modulated write data. The write signal is sent to the write signal gate 19 via the selector 18. The write signal gate 19 provides the selected write signal to the head 12 in response to a timing signal from the write timing generation circuit 15. In this way, DVD format data is written to a predetermined position of the disc (CD) 11.

The data recording controller 100 records DVD format data, which has undergone 8-16 modulation based on DVD format data, is recorded on the disc 11 regardless of whether the recording medium is a DVD or a CD. A medium recognition circuit 110 determines whether the disc subject to writing is a DVD or a CD, and the medium recognition circuit 110 outputs the switching control signal.

The conversion of address information with the address converter 55 will now be described. A method for representing the address information used in a CD and a DVD will first be described.

When using a CD as the recording medium, the ATIP address included in the information read from the wobble signal 23a is data having 24 bits. In the 24 bits of data, the higher 8 bits represent minutes (MIN) and the subsequent 8 bits represent seconds (SEC) and the lower 8 bits represent frames (FRM). The 24-bit address data is represented by a binary coded decimal (BCD) code. The left column of FIG. 4 shows the 24 bits represented by decimals when dividing the 24 bits by 4 bits. The data of MIN, SEC, and FRM are each shown by two-digit decimals and the numeric range of each data is as shown below.

$$00 \leqq MIN \leqq 99$$

$$00 \leqq SEC \leqq 99$$

$$00 \leqq FPM \leqq 74$$

A user area, in which a user of the CD uses to record data, is in the range of "$00 \leqq MIN \leqq 79$" and information related with the disc is recorded in the range of "$80 \leqq MIN$", which is used as a reserved area and referred to as table of contents (TOC).

When using a DVD as the recording medium, the LPP address included in the information read from the LPP signal 13a is data having 24 bits. The LPP address is expressed by a hexadecimal after successively adding sector numbers to a recording track of the entire disc. Using 0x0040E0 as a base point, two sectors of the LPP address are assigned in correspondence with each frame of the ATIP address. The user area is the sectors from 0x030000 and above, and the reserved area is the sector from 0x030000 and below. When 0x is added to the beginning of an address, this indicates that the address is expressed by a hexadecimal The address converter 55 converts the ATIP address to an LPP address by performing the procedure shown in FIG. 5. In FIG. 5, ATIP [23:20] indicates the 4 bits from the 23rd (highest order bit) to 20th bit in the 24-bit ATIP data.

The address converter 55 calculates the value of MIN, SEC, and FRM from the ATIP data with the following equations in response to the input of the ATIP data $$MIN=ATIP\ [23:20] \times 10 + ATIP\ [19:16]$$

$$SEC=ATIP\ [15:12] \times 10 + ATIP\ [11:8]$$

$$FRM=ATIP\ [7:4] \times 10 + ATIP\ [3:0]$$

The address converter determines whether the calculated MIN value exceeds 80 (step S302). If the value MIN is smaller than 80 (YES in step S302), the sector number in the LPP address is calculated from the ATIP data in accordance in accordance with the following equation (step S304).

$$SECTOR=0 \times 030000 + CNT \times 2$$

$$CNT=MIN \times 60 \times 75 + SEC \times 75 + FRM$$

When the value MIN is greater than or equal to 80 (NO in step S302), the sector number in the LPP address is calculated from the ATIP data in accordance with-the following equation (Step S303).

$$SECTOR=0 \times 030000 - (100 \times 60 \times 75 - CNT) \times 2$$

The conversion equations convert the ATIP address, which is detected from the CD wobble signal, into a DVD LPP address. Data in DVD format is recorded on (written to) a CD at a position designated by the converted LPP address.

When the disc type of a recording subject is not recognized properly, the data recording controller 100 gives priority to processing using the LPP data 14a. However, when the LPP address calculated from the LPP data 14a is determined as being improper, processing using the converted LPP data 55a is performed.

Figure 1:
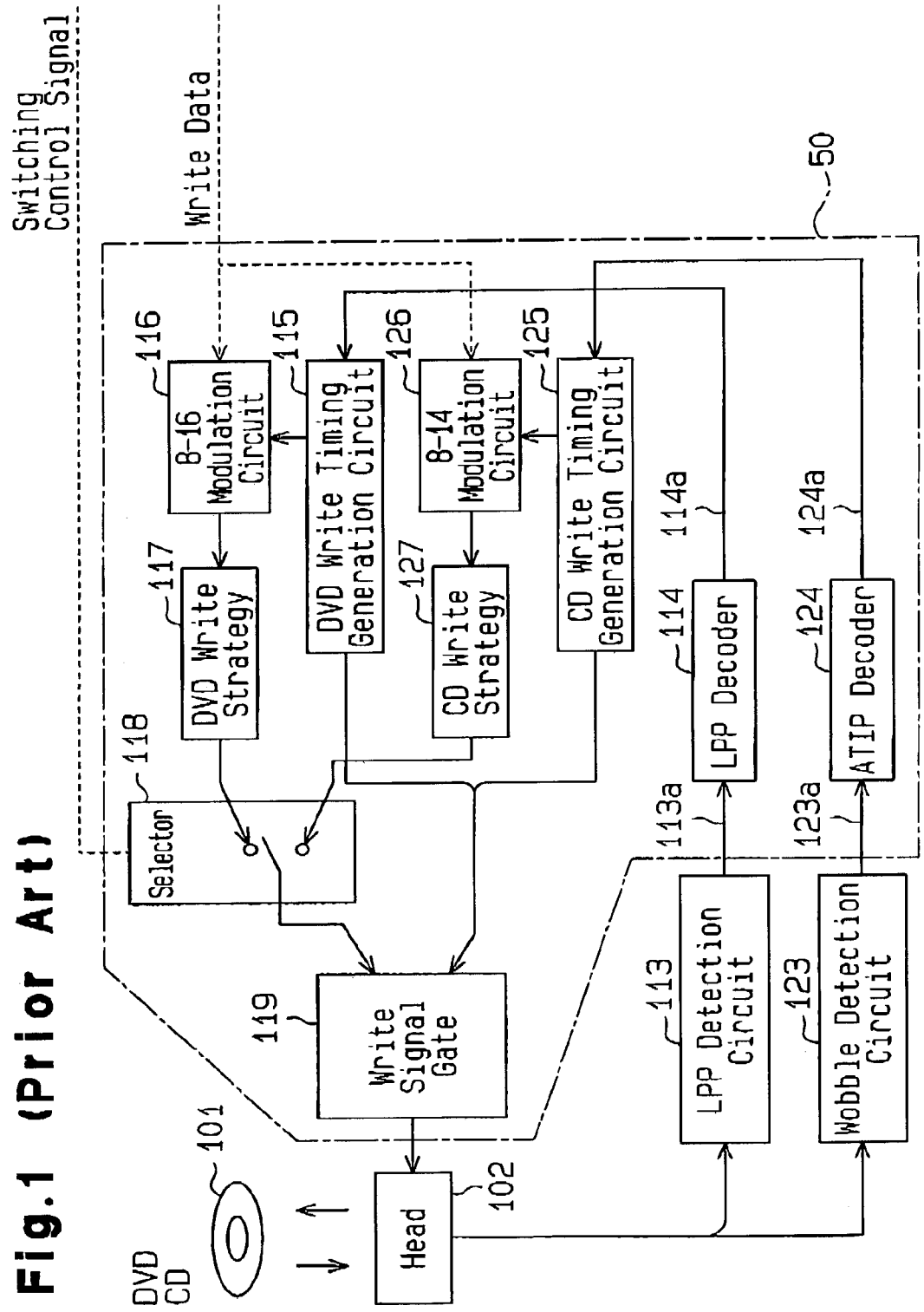
FIG. 1 is a block diagram of a prior art data recording controller.
Figure 2A:
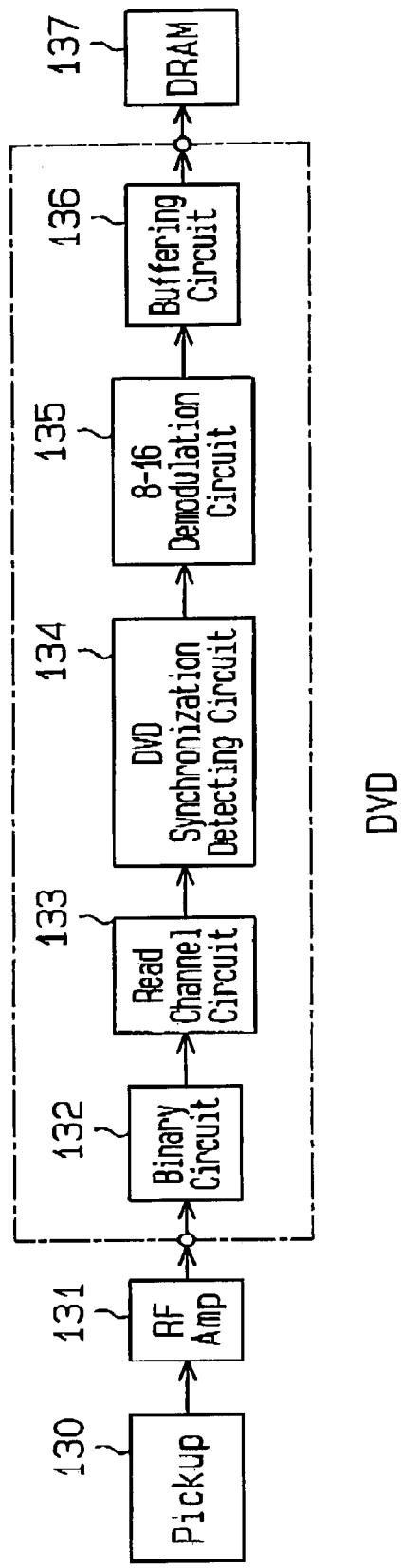
FIG. 2A shows the flow of DVD data reproduced by the prior art data recording controller.
Figure 2B:
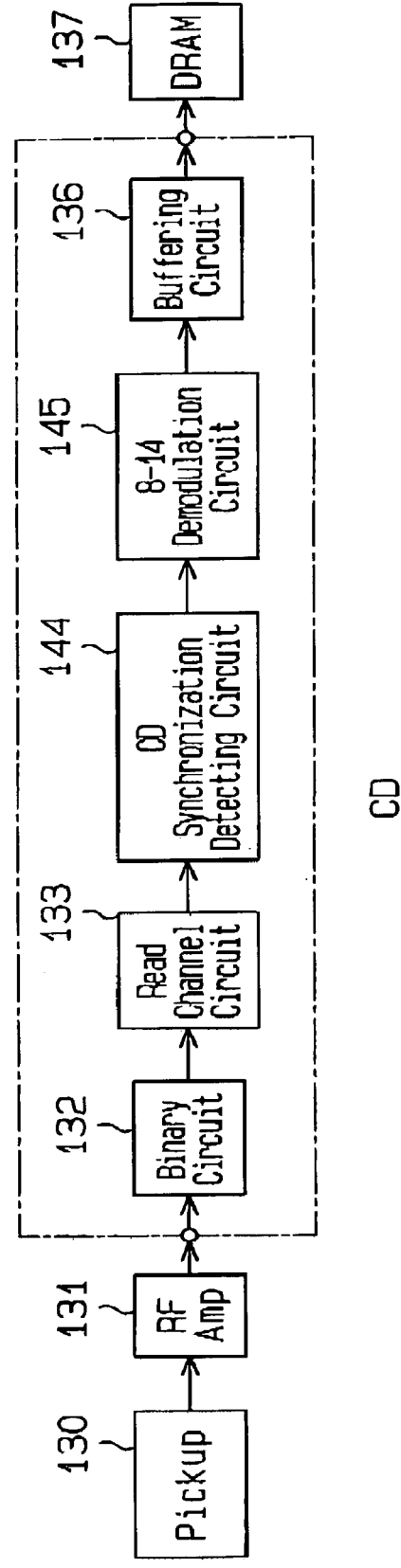
FIG. 2B shows the flow of CD data reproduced by the prior art data recording controller.

The DVD format data, which is recorded on a CD, is reproduced by a process shown in FIG. 2A. First, a signal read by a pickup 130 is amplified by an RF amp 131. The amplified signal is converted into digital data of 0 or 1 by a binary circuit 132. The converted digital data is sampled at a predetermined sampling frequency in response to a read channel clock signal, which is generated by a read channel circuit 133. A DVD synchronization detecting circuit 134 detects a synchronization signal from the sampled digital data to extract data, which is subject to reading. The extracted data is demodulated by an 8-16 demodulation circuit 135. The demodulated data is sent to a DRAM via a buffering circuit 136.

Except for some optical components or circuits for processing picked up signals, DVD format data, which is recorded on a CD with the data recording controller 100, is reproduced by various circuits used to reproducing data.

As described above, the data recording controller 100 of the first embodiment has the advantages described below.

(1) Simple changes, such as the adding of the address converter 55, enables the DVD data recorder to record DVD format data, the recording density of which is greater than that of CD format data, on a CD without having to use various circuits for recording data on a CD.

(2) DVD format data, which is recorded on a CD, is reproduced without using various exclusive circuits, which are required for reading (reproducing) data from a CD.

(3) when an external circuit cannot properly recognize the type of recording medium, priority is given to the acquisition of address information from the LPP data 14a.

(4) When the data calculated from the LPP data 14a is determined as being improper, the converted LPP data 55a is used.

(5) Either one of the DVD write strategy circuit 17 and the CD write strategy circuit 27 is used depending on whether a DVD is used or a CD is used. For this reason, the intensity of the write signal is adjusted to proper level in correspondence with the type of the disc 11, which is subject to writing. As a result, data is recorded on any type of disc with a high reliability.

(6) Since DVD format data is recorded, the powerful DVD error correction function records data with high reliability when using a CD serving as the recording medium, as well as when using a DVD as the recording medium A data recording controller 200 according to a second embodiment of the present invention will now be described with reference to FIG. 6 focusing on the differences from the first embodiment. The data recording controller 200 of the second embodiment enables a data recorder, which uses a DVD as a recording medium, to record data on a CD in a CD format or a DVD format.

Figure 3:
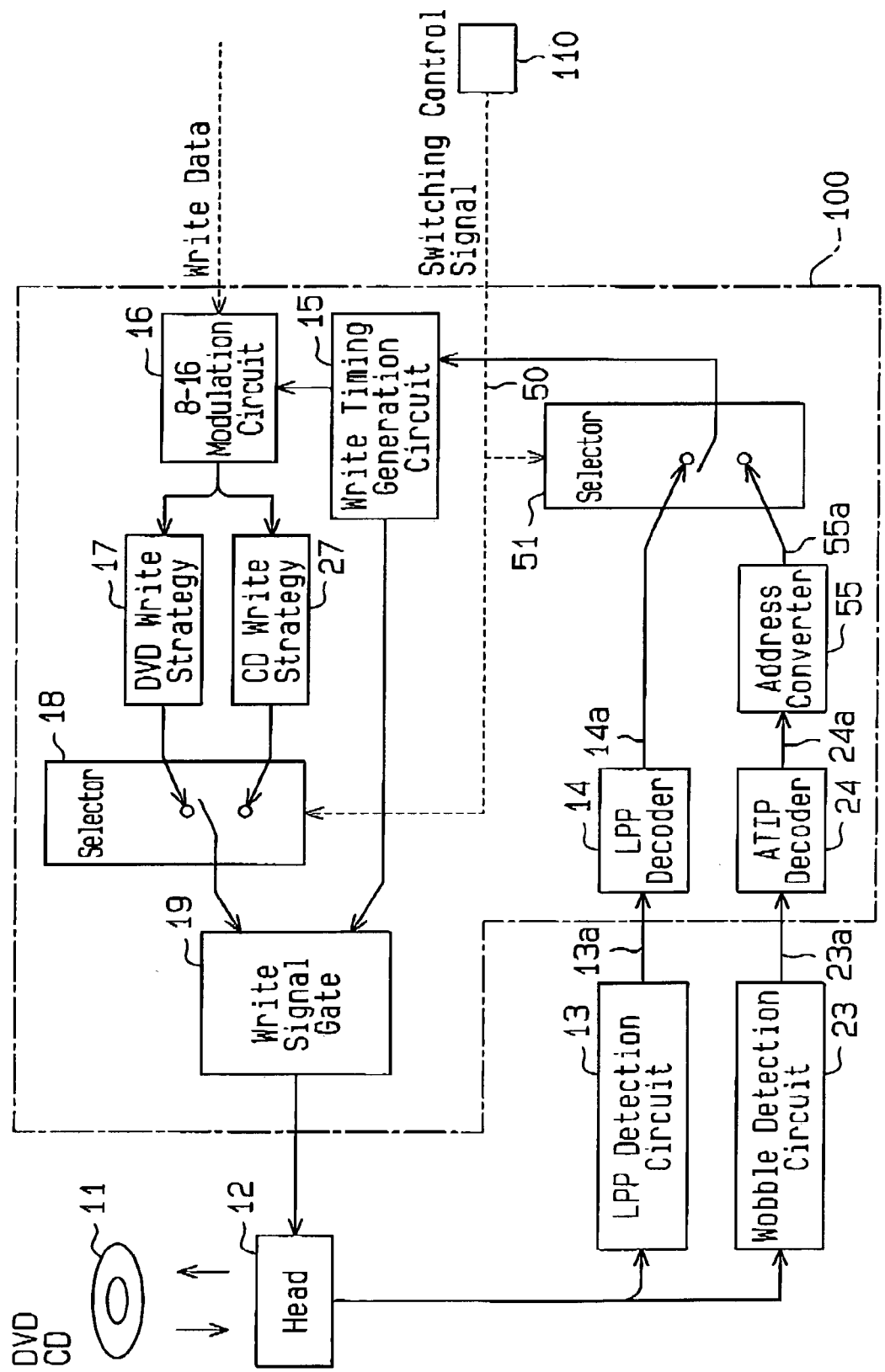
FIG. 3 is a block diagram of a data recording controller according to a first embodiment of the present invention.
Figure 6:
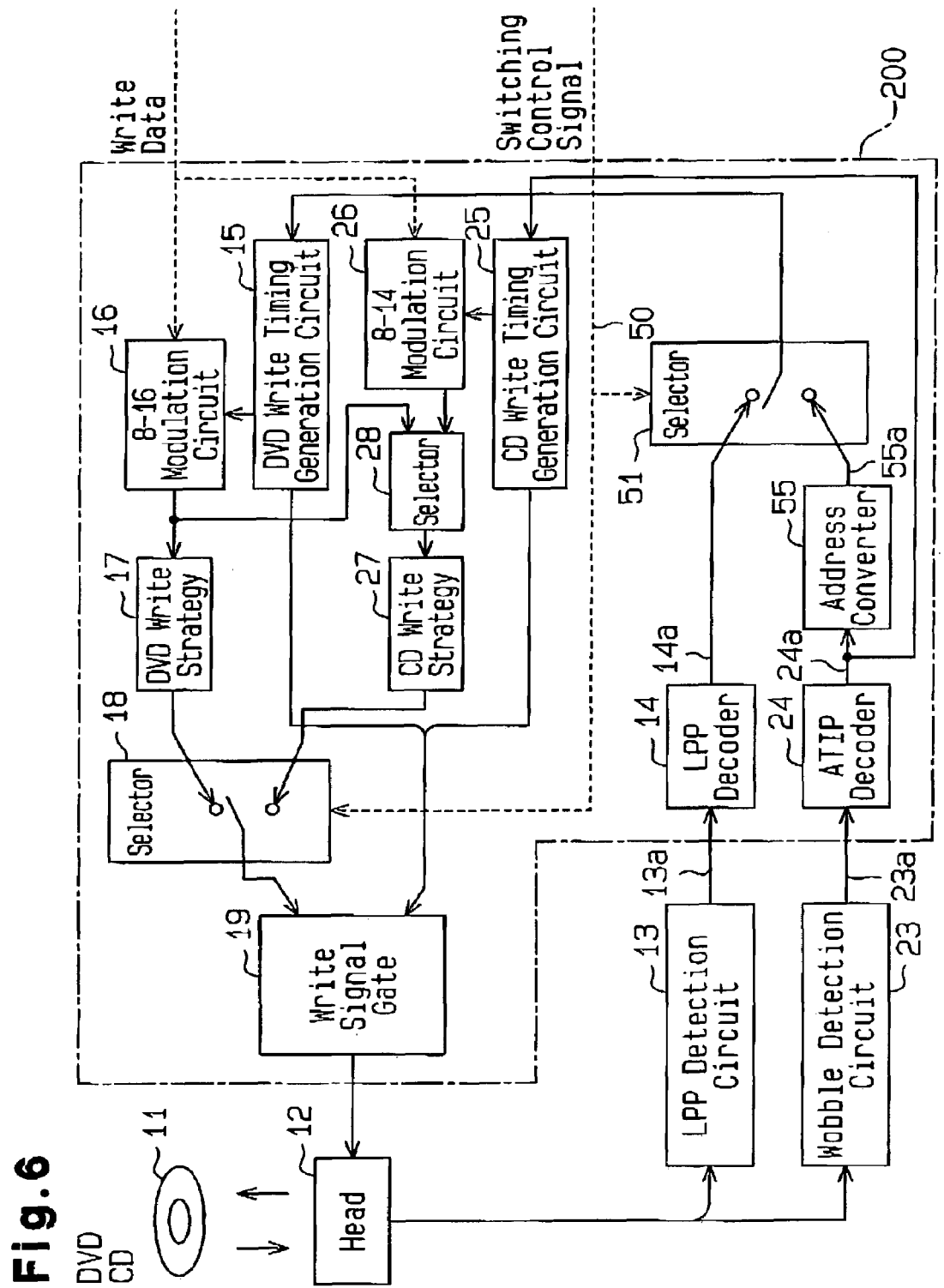
FIG. 6 is a block diagram of a data recording controller according to a second embodiment of the present invention.

The data recording controller 200 of FIG. 6 includes a CD write timing generation circuit 25, an 8-14 modulation circuit 26, and a selector 28 in addition to the configuration of the data recording controller 100 of FIG. 3. The ATIP data 24a output from the ATIP decoder 24 is also provided to the CD write timing generation circuit 25. The DVD write timing generation circuit 15 of FIG. 6 is identical to the write timing generation circuit 15 of FIG. 3.

The addition of the CD write timing generation circuit 25, the 8-14 modulation circuit 26, and the selector 28 enable the recording of CD format data to a CD. When a gate signal is provided from the DVD write timing generation circuit 15 or the CD write timing generation circuit 25 to the write signal gate 19, the signal output from the selected write strategy circuit, which is selected by the selector 18, is provided to the head 12 via the write signal gate 19. This writes the desired CD format data or DVD format data to a predetermined position of the disc (CD) 11.

As described above, the data recording controller 200 according to the second embodiment has the advantage described below.

(7) Data is recorded on a DVD in a normal manner and recorded on a DVD in CD format or DVD format. Accordingly, the versatility of the disc medium is improved and data is recorded in a more flexible way.

It should be apparent to those skilled in the art that the present invention may be embodied in many other specific forms without departing from the spirit or scope of the invention. Particularly, it should be understood that the present invention may be embodied in the following forms.

In the first embodiment, when obtaining the LPP address, which is the DVD address information, from the wobble signal 23a, the ATIP decoder 24 first calculates the ATIP address and converts the address to the LPP address. However, the present invention is not limited to such a configuration. The wobble signal 23a may be directly converted into the LPP address without calculating the ATIP address.

In the first and second embodiments, the switching operations of the selectors 18 and 51 are controlled in accordance with the switching control signal, which is provided from the external circuit. However, the present invention is not limited to such configurations. The switching operations of the selectors 18 and 51 may be controlled by an address signal detected by internal circuits of the data recording controller 100 and 200, such as the LPP decoder 14 and ATIP decoder, instead of by the switching control signal.

The data recording controllers 100 and 200 of the first and second embodiments have the DVD write strategy circuit 17 and the CD write strategy circuit 27, which adjust the intensity of the write signal in accordance with the type of the recording medium. However, the present invention is not limited to such a configuration. For example, the write strategy circuits 17 and 27 may be external circuits of the data recorder. This simplifies the configuration of the data recording controller.

In the first and second embodiments, the recorder using a DVD as the recording medium also uses the CD as the recording medium. However, the present invention is not limited to such a configuration. The present invention may be applied to a data recording controller that uses any type of arbitrary data recorder, which records data on a medium including information of a data recording position.

The present examples and embodiments are to be considered as illustrative and not restrictive, and the invention is not to be limited to the details given herein, but may be modified within the scope and equivalence of the appended claims

What is claimed is:

1. A data recording controller for controlling recording of data to a first disc medium on which first address information is recorded in compliance with a first recording format, in compliance with a second recording format that has a recording density greater than the first recording format, the data recording controller comprising:
   a first address generation circuit for generating first address data based on the first address information read from the first disc medium;
   a conversion circuit, connected to the first address generation circuit, for converting the first address data to generate converted address data complying with the second recording format;
   a second address generation circuit for generating second address data complying with the second recording format based on second address information read from a second disc medium and complying with the second recording format;
   an address selection circuit, connected to the second address generation circuit and the conversion circuit, for selecting and outputting one of the second address data generated by the second address generation circuit, and the converted address data; and
   a first timing generation circuit, connected to the address selection circuit, for generating a timing for writing of data to the first disc medium in accordance with said one of the second address data and the converted address data selected by the address selection circuit.

2. The data recording controller according to claim 1, wherein the address selection circuit selects the second address data when the second position information complying with the second address format is read, and selects the converted address data when the first address information complying with the first recording format is read.

3. The data recording controller according to claim 1, wherein the address selection circuit gives priority to the selection of the second address data and selects the converted address data when reading of the second address information is not detected.

4. The data recoding controller according to claim 1, wherein the address selection circuit selects address data in accordance with an external control signal.

5. The data recording controller according to claim 1, further comprising a second timing generation circuit which generates a timing for writing data to the first disc medium based on the first address data.

6. The data recording controller according to claim 1, further comprising:
   a modulation circuit which performs modulation corresponding to the second recording format on write data in accordance with a write timing generated by the first timing generation circuit to generate modulated data; and
   a write strategy circuit which generates a write signal having an intensity of which is adjusted in accordance with the type of recording medium from the modulated write data.

7. The data recording controller according to claim 5, further comprising:
   a first modulation circuit which performs a first modulation corresponding to the first recording format on write data in accordance with a write timing generated by the second timing generation circuit to generate first modulated write data;
   a second modulation circuit which performs a second modulation corresponding to the second recording format on write data in accordance with a write timing generated by the first generation circuit to generate second modulated write data;
   a first write strategy circuit which generates a first write signal having an intensity of which is adjusted in accordance with the first disc medium, from one of the first modulated write data and the second modulated write data; and
   a second write strategy circuit which generates a second write signal having an intensity of which is adjusted in accordance with the second disc medium, from the second modulated write data.

8. A data recording controller for recording data to a first recording medium on which first address information complying with a first recording format is recorded, in compliance with a second recording format corresponding to a second recording medium, having a recording density that is greater than the first recording medium, the data recording controller comprising:

a first decoder for decoding a signal read from the first recording medium and generating first address data complying with the first format;

a converter, connected to the first decoder, for converting the first address data to generate converted address data complying with the second format;

a second decoder for decoding second address information read from the second recording medium and generating second address data complying with the second format; and an address selection circuit, connected to the second decoder and the converter, for selecting and outputting one of the second address data and the converted address data.

9. The data recording controller according to claim 8, further comprising:

a write timing generation circuit which generates a write timing in accordance with the type of the recording medium in response to an input of one of the converted address data and the second address data;

a signal gate which provides a write signal to a recording head in accordance with the write timing.

10. The data recording controller according to claim 9, further comprising an address selection circuit connected to the converter and the second decoder which provides one of the converted address data and the second address data to the write timing generation circuit in accordance with an external control signal.

11. The data recording controller according to claim 10, wherein the address selection circuit selects the second address data when second address information complying with the second recording format is read and selects the converted address data when first address information complying with the first recording format is read.

12. The data recording controller according to claim 10, wherein the address selection circuit gives priority to the selection of the second address data, and selects the converted address data when reading of the second address information is not detected.

13. The data recording controller according to claim 9, further comprising:

a modulation circuit which performs modulation corresponding to the second recording format on write data in accordance with a command from the write timing generation circuit to generate modulated write data; and a write strategy circuit which generates a write signal having the intensity of which is adjusted in accordance with the type of the recording medium from the modulated write data.

14. The data recording controller according to claim 9, wherein the write timing generation circuit includes a first write timing generation circuit which generates a write timing corresponding to the second format, and a second write timing generation circuit which generates a write timing corresponding to the first format, the data recording controller further comprising:

a first modulation circuit which performs a first modulation corresponding to the first recording format on write data in accordance with write timing generated by the second timing generation circuit and generating first modulated write data;

a second modulation circuit which performs a second modulation corresponding to the second recording format on write data in accordance with a write timing generated by the first timing generation circuit to generate second modulated write data;

a first write strategy circuit which generates a first write signal having an intensity of which is adjusted in accordance with the first recoding medium, from one of the first modulated write data and the second modulated write data; and a second write strategy circuit which generates a second write signal having an intensity of which is adjusted in accordance with the second recording medium from the second modulated write data.

15. The data recording controller according to claim 8, wherein the first recording format is a CD format, and the second recording format is a DVD format.

16. The data recording controller according to claim 15, wherein the first recording medium is a writable CD, the first address information is ATIP information, the second disc medium is a writable DVD, and the second position information is LPP information.

17. The data recording controller according to claim 15, wherein the first address information includes absolute time information, and the second address information includes a sector number.

18. A method for controlling recording of data to a recording medium on which first address information is recorded complying with a first recording format, in compliance with a second recording format that has a recording density greater than the first recording format, and wherein second address information is recorded on another recording medium, the method comprising:

reading first address information from the recording medium;

generating first address data based on first address information read from the recording medium;

converting the first address data into converted address data complying with the second recording format:

reading second address information from the another recording medium;

generating second address data complying with the second recording format based on and in compliance with the second address information read from the another recording medium;

selecting and outputting one of the second address data and the converted address data;

generating a timing for writing data to the recording medium based on said selected one of the second address data and the converted address data; and recording data to the recording medium in accordance with said timing.

* * * * *